E. F. PRICE.
PROCESS OF PRODUCING FERRO ALLOYS.
APPLICATION FILED JUNE 1, 1907.

942,349.

Patented Dec 7, 1909.

Witnesses:
G. E. Gauntt
Charles H. Potter

Inventor:
Edgar F. Price,
by Byrnes & Townsend,
Attys.

UNITED STATES PATENT OFFICE.

EDGAR F. PRICE, OF NIAGARA FALLS, NEW YORK, ASSIGNOR, BY MESNE ASSIGNMENTS, TO CENTRAL TRUST COMPANY OF NEW YORK, TRUSTEE, A CORPORATION OF NEW YORK.

PROCESS OF PRODUCING FERRO ALLOYS.

942,349.      Specification of Letters Patent.      Patented Dec. 7, 1909.

Application filed June 1, 1907. Serial No. 376,882.

*To all whom it may concern:*

Be it known that I, EDGAR F. PRICE, a citizen of the United States, residing at Niagara Falls, in the county of Niagara and State of New York, have invented certain new and useful Improvements in Processes of Producing Ferro Alloys, of which the following is a specification.

In my United States Patent Number 790,391, dated May 23, 1905, I have described a process of producing ferro-alloys in which a considerable body of the charge, for example a mixture of silica, iron ore and carbon, is maintained around depending carbon electrodes of opposite polarity, thereby embedding the zone of reduction, retaining the heat within the furnace, increasing the production of metal, keeping the slag in a liquid condition, and protecting the electrodes from the oxidizing and cooling effect of the atmosphere. While the use of this deep charge-body is advantageous, it is found necessary in practice to employ a charge of coarsely-granular materials, in order to permit the ready escape of the large volumes of gas which are evolved during reduction. A finely-divided charge is preferable in many respects, enabling reduction to proceed more rapidly and smoothly, but when a deep body of finely-divided materials is maintained around the electrodes, the gases escape violently by openings which they force through the body, blowing out portions of the hot unreduced charge and agitating the molten or semi-molten contents so as to shortcircuit the electrodes.

The present invention is a process of producing ferro-alloys, specifically ferro-silicon, in which the zone of reduction is surrounded and the electrodes are embedded by a deep body of a finely-divided charge. The waste gases are withdrawn laterally in different directions beneath the surface of the charge.

Figure 1:
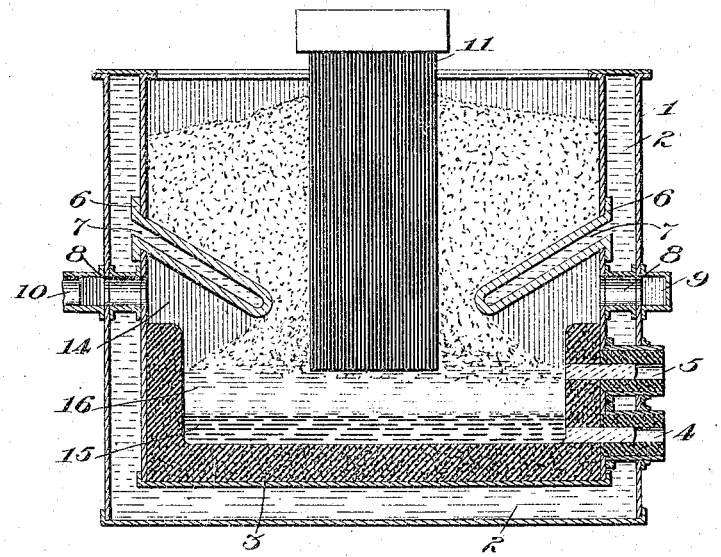
Figure 2:
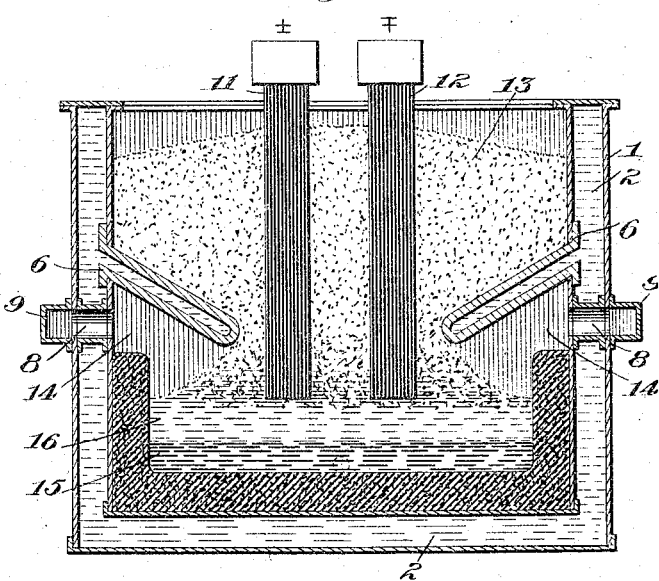

Suitable apparatus for carrying out the process is shown in the accompanying drawings, in which:

Figure 1 is a transverse vertical section of an electric furnace; and Fig. 2 is a vertical section of the same furnace, in a plane at right angles to that of Fig. 1.

The furnace illustrated comprises a rectangular or circular iron pot 1, with double side walls and bottom containing water-chambers 2. The lower part of the pot has a carbon lining 3. Superposed tapholes 4, 5 for metal and slag respectively extend through one side of the pot. A downwardly-inclined rectangular or annular shelf 6 extends inward from the sides of the pot, about midway its height. This shelf, which may be of cast steel, has a continuous water-chamber 7 opening into the spaces 2 of the side walls. A series of openings 8 extend horizontally through the side walls of the pot, beneath the shelf 6, and communicate with an external horizontal passage 9 from which leads an exhaust pipe 10. Carbon electrodes 11, 12 of opposite polarity depend into the pot. The charge 13, for example a mixture of silica, carbon and pieces of iron or iron ore, rests on the shelf 6 and extends upward around the electrodes so as to embed the major portion of them. During operation, the charge gravitates downward and is directed inward toward the zone of reduction by the sloping shelf, while the spaces 14 beneath the shelf remain open and, with the openings 8, external passage 9, and pipe 10, provide free lateral exits for the waste gases. The reduced metal and slag collect in superposed layers 15, 16 and are withdrawn from time to time through the tapholes 4, 5. By thus withdrawing the waste gases laterally in different directions beneath the surface of the charge, it is possible to effect the production of ferro-alloys by the process of my specified Patent 790,391, and to employ a charge of finely-divided materials, thereby decreasing the cost and increasing the speed and regularity of the reduction.

I claim:

1. The process of producing ferro-alloys, which consists in electrically smelting a finely-divided charge of a metallic compound, a reducing agent and a source of iron, surrounding and embedding the zone of reduction and protecting the electrodes from the oxidizing and cooling effect of the atmosphere by a considerable body of the charge, and withdrawing the waste gases beneath the surface of the charge.

2. The process of producing ferro-alloys, which consists in electrically smelting a finely-divided charge of a metallic compound, a reducing agent and a source of iron, surrounding and embedding the zone of reduction and protecting the electrodes from the oxidizing and cooling effect of the atmosphere by a considerable body of the charge, and withdrawing the waste gases laterally in different directions beneath the surface of the charge.

3. The process of producing ferro-silicon, which consists in electrically smelting a finely-divided charge of a silicon compound, a reducing agent and a source of iron, surrounding and embedding the zone of reduction and protecting the electrodes from the oxidizing and cooling effect of the atmosphere by a considerable body of the charge, and withdrawing the waste gases beneath the surface of the charge.

4. The process of producing ferro-silicon, which consists in electrically smelting a finely-divided charge of a silicon compound, a reducing agent and a source of iron, surrounding and embedding the zone of reduction and protecting the electrodes from the oxidizing and cooling effect of the atmosphere by a considerable body of the charge, and withdrawing the waste gases laterally in different directions beneath the surface of the charge.

In testimony whereof, I affix my signature in presence of two witnesses.

EDGAR F. PRICE.

Witnesses:
I. R. EDMONDS,
H. L. NOYES.